(12) United States Patent
Bazot et al.

(10) Patent No.: US 10,858,954 B2
(45) Date of Patent: Dec. 8, 2020

(54) TURBO-ENGINE HOUSING, EQUIPPED WITH A THERMAL PROTECTION SHELL AND AN ANTI-WEAR STRIP

(71) Applicant: SAFRAN AIRCRAFT ENGINES, Paris (FR)

(72) Inventors: Olivier Bazot, Moissy-Cramayel (FR); Jérémy Philippe Pierre Edynak, Moissy-Cramayel (FR); Farhana Hussain, Moissy-Cramayel (FR); Fanny Marie Libes, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 153 days.

(21) Appl. No.: 16/163,814

(22) Filed: Oct. 18, 2018

(65) Prior Publication Data

US 2019/0120083 A1  Apr. 25, 2019

(30) Foreign Application Priority Data

Oct. 20, 2017 (FR) ..................................... 17 59880

(51) Int. Cl.
  *F01D 25/14* (2006.01)
  *F01D 25/26* (2006.01)
  *F01D 25/24* (2006.01)

(52) U.S. Cl.
  CPC ......... *F01D 25/145* (2013.01); *F01D 25/246* (2013.01); *F01D 25/26* (2013.01); *F05D 2220/3219* (2013.01); *F05D 2230/60* (2013.01); *F05D 2240/15* (2013.01); *F05D 2260/231* (2013.01); *F05D 2300/17* (2013.01)

(58) Field of Classification Search
  CPC ...... F01D 25/145; F01D 25/246; F01D 25/26; F05D 2220/3219; F05D 2230/60; F05D 2240/15; F05D 2260/231; F05D 2300/17
  See application file for complete search history.

(56) References Cited

U.S. PATENT DOCUMENTS

| | | | | | |
|---|---|---|---|---|---|
| 4,921,401 | A | * | 5/1990 | Hall | ......................... F01D 9/04 |
| | | | | | 415/138 |
| 5,273,397 | A | * | 12/1993 | Czachor | ................... F01D 25/14 |
| | | | | | 415/116 |
| 7,614,845 | B2 | * | 11/2009 | Adam | ................... F01D 25/145 |
| | | | | | 415/134 |

(Continued)

FOREIGN PATENT DOCUMENTS

| EP | 1698761 A2 | 9/2006 |
|---|---|---|
| FR | 2925108 A1 | 6/2009 |
| WO | 2017203158 A1 | 11/2017 |

OTHER PUBLICATIONS

Search Report issued in French Patent Application No. 1759880 dated Jun. 7, 2018.

*Primary Examiner* — Kenneth J Hansen
*Assistant Examiner* — Brian O Peters
(74) *Attorney, Agent, or Firm* — Pearne & Gordon LLP

(57) ABSTRACT

A turbo-engine module comprises a turbo-engine housing, and a thermal protection shell of the housing. The thermal protection shell is configured to cover at least partially the housing in order to protect same thermally. The module comprises a wear protection strip which is situated between the housing and the thermal protection shell, in a junction region of the housing and the thermal protection shell.

15 Claims, 3 Drawing Sheets

(56) References Cited

U.S. PATENT DOCUMENTS

| | | | |
|---|---|---|---|
| 10,100,670 B2* | 10/2018 | Leslie | F01D 25/145 |
| 2016/0123187 A1 | 5/2016 | Leslie et al. | |
| 2018/0023417 A1* | 1/2018 | Ponchak | F01D 25/24 |
| | | | 415/177 |
| 2018/0283397 A1* | 10/2018 | Sakala | F01D 9/02 |
| 2019/0031362 A1* | 1/2019 | Petty, Sr. | F02K 1/825 |

* cited by examiner

TURBO-ENGINE HOUSING, EQUIPPED WITH A THERMAL PROTECTION SHELL AND AN ANTI-WEAR STRIP

This application claims priority from French Patent Application No. 1759880, filed Oct. 20, 2017, the content of which is incorporated by reference herein in its entirety.

TECHNICAL FIELD

The invention relates to the general technical field of aircraft turbo-engines such as turbojets and turboprops. More specifically, the invention relates to turbo-engine housings, which are equipped with a thermal protection shell.

STATE OF THE RELATED ART

A turbo-engine comprises at least three modules: a compressor module, a combustion chamber module and a turbine module. The compressor module is designed to compress an air stream traversing a compressor. The turbine module serves to recover the power resulting from the expansion of an air stream traversing the turbine module and to transmit this power to the compressor module. Each of these modules comprises at least one housing.

Some of these housings are covered at least partially by a protective sheet which forms a thermal protection shell of the housing. The protective sheet is intended to limit differential expansions of the housing. These differential expansions may lead to air leakages in the primary jet or to eddy currents at the tip of mobile blades also referred to as clearance eddy currents. These air leakages and these clearance eddy currents are detrimental to the turbo-engine efficiency.

Nevertheless, wear zones may appear at the junction of the housing and the shell. These wear zones may lead to early replacement of the damaged housing.

Therefore, there is a need to limit the wear of a turbo-engine housing by such shells which are intended to protect the housing thermally in order to limit air leakages and eddy currents at the tip of mobile blades.

DESCRIPTION OF THE INVENTION

The invention aims to resolve at least partially the problems encountered in the solutions according to the prior art.

In this regard, the invention relates to a turbo-engine module. The turbo-engine module comprises a housing and a thermal protection shell of the housing.

The housing is a turbo-engine housing. The thermal protection shell is configured to cover at least partially the housing in order to protect the housing thermally.

According to the invention, the module comprises a wear protection strip, which is situated between the housing and the thermal protection shell in a junction region of the housing and the thermal protection shell. The wear protection strip comprises at least one recess, the wear protection strip is open-worked at the level of the recess, the recess being situated outside a zone for fastening the wear protection strip to the thermal protection shell and/or a zone for fastening the wear protection strip to the housing.

By means of the invention, wear zones of the housing are reduced due to the wear protection strip. The housing is also thermally protected by the thermal protection shell, the air leakages and eddy currents at the tip of mobile blades are limited.

The mass of the wear protection strip and the rigidity thereof are reduced due to the recess, which facilitates the installation of the wear protection strip. Moreover, the effects of the wear protection strip on thermal expansion of the housing are limited due to the recess.

The wear protection strip is particularly bearing against the housing and against the thermal protection shell. The recess is situated particularly outside the bearing zones of the thermal protection shell against the housing. The wear protection strip is preferably made of metallic material.

The invention may optionally include one or a plurality of the following features combined with one another or not.

According to one specific embodiment, the protection strip covers a housing portion, the wear protection strip is made of the same material as the material of the housing portion covered by the wear protection strip.

According to a further specific embodiment, the wear protection strip is made of the same material as the material of the thermal protection shell.

The differential thermal expansions between the wear protection strip, the housing and/or the thermal protection shell are then limited. The wear of the housing is limited further.

According to one specific embodiment, the wear protection strip has a thickness between 0.3 mm and 0.8 mm.

Due to the small thickness thereof, the mass of the module is limited, and the influence of the wear protection strip on the thermal expansion of the housing is limited.

Advantageously, the thermal protection shell is secured to the housing by at least one attachment. The wear protection strip is fastened to the housing and to the thermal protection shell by the attachment.

Preferably, the attachment comprising a fastening screw.

According to one specific embodiment, the wear protection strip is pressed against the housing, particularly by the thermal protection shell, the wear protection strip moulding the shape of the portion of housing covered thereby.

The wear protection strip better protects the housing mechanically, particularly against vibrations.

According to one specific embodiment, the thermal protection shell is centred with respect to the wear protection strip along the longitudinal direction of the module, the wear protection strip being of greater width than that of the thermal protection shell, along the longitudinal direction of the module.

Thus, the thermal protection shell remains in mechanical contact with the wear protection strip during the operation of the turbo-engine.

According to a further specific embodiment, the wear protection strip comprises a first circumferential segment intended to be in a first bearing zone of the shell against the housing, a second circumferential segment which is axially spaced with respect to the first circumferential segment and which is intended to be in a second bearing zone of the shell against the housing, and a connection zone between the circumferential segments. The connection zone connects the first circumferential segment to the second circumferential segment.

According to a further specific embodiment, the connection zone is a zone for fastening the wear protection strip to the thermal protection shell.

According to a further specific embodiment, the connection zone is a zone for fastening the wear protection strip to the housing.

According to a further specific embodiment, the housing comprises an annular boss which is situated axially between the first circumferential segment and the second circumferential segment, axially abutting against the first circumferential segment and the second circumferential segment.

According to a further specific embodiment, the recess is situated axially between the first bearing zone of the thermal protection shell against the housing and the second bearing zone of the thermal protection shell against the housing.

Advantageously, the wear protection strip comprises a first annular sector and a second annular sector which is adjacent to the first annular sector along a circumferential direction of the module. The first annular sector and the second annular sector are particularly arranged circumferentially end to end.

According to one advantageous embodiment, the module comprises a turbo-engine compressor.

Alternatively, the module particularly comprises a compressor module portion.

Preferably, the compressor is a high-pressure turbo-engine compressor.

Alternatively, the compressor is a low-pressure compressor.

Alternatively again, the turbo-engine module according to the invention is a combustion chamber module and/or a turbine module.

Advantageously, the housing is situated radially outside a gas flow jet in the turbo-engine relative to a longitudinal axis of the module, the housing being traversed by orifices for extracting air in the jet.

According to one specific embodiment, the housing comprises a first portion in a first material, and a second portion. The second portion is adjacent to the first portion along the longitudinal axis of the module which is oriented in the gas flow direction through the module. The second portion is made of a second material having a lower thermal expansion coefficient than that of the first material.

The invention also relates to a turbo-engine comprising the module as defined above. Preferably, the turbo-engine is an aircraft turbo-engine.

BRIEF DESCRIPTION OF THE FIGURES

The present invention will be understood more clearly on reading the description of examples of embodiments, given merely by way of indication and not by way of limitation, with reference to the appended figures wherein.

DETAILED DESCRIPTION OF PARTICULAR EMBODIMENTS

Identical, similar or equivalent parts of the various figures bear the same reference numbers so as to facilitate the transition from one figure to another.

Figure 1:
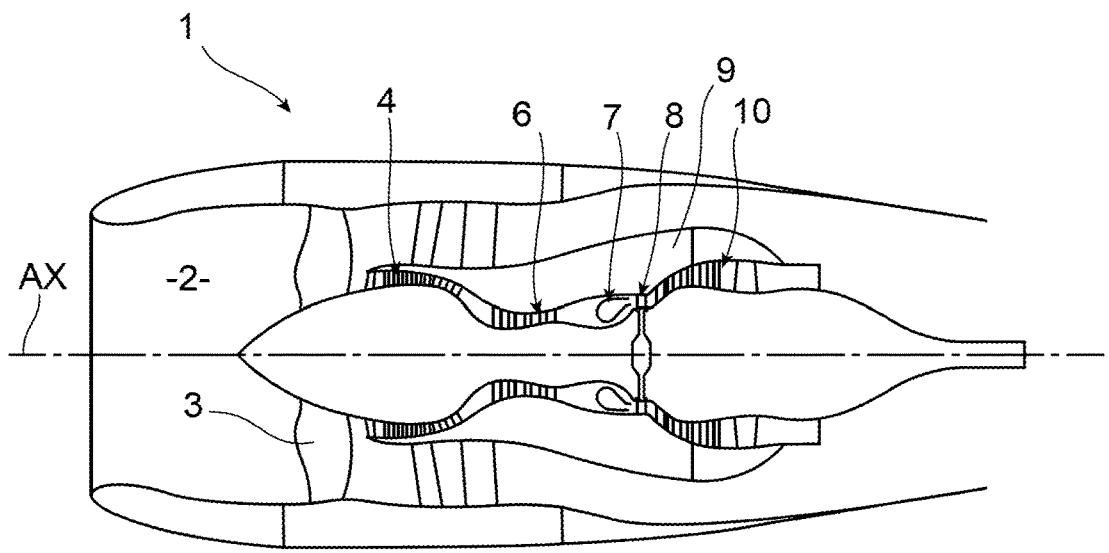
FIG. 1 is a partial schematic longitudinal sectional representation of a turbo-engine, according to a first embodiment of the invention.

FIG. 1 represents a dual-flow and dual-body turbo-engine 1. The turbo-engine 1 is a turbojet which has a rotational shape about a longitudinal axis AX.

The turbo-engine 1 comprises, from upstream to downstream along a primary stream, an air intake duct 2, a fan 3, a low-pressure compressor 4, a high-pressure compressor 6, a combustion chamber 7, a high-pressure turbine 8 and a low-pressure turbine 10. This primary stream flows in a primary jet of the turbo-engine 1.

The upstream and downstream directions are used in this document with reference to the overall flow of the gases in the turbojet, such a direction is substantially parallel to the direction of the longitudinal axis AX.

A secondary flow jet of a second stream is arranged radially outside the primary jet which traverses the low-pressure compressor 4, the high-pressure compressor 6, the high-pressure turbine 8 and the low-pressure turbine 10.

The high-pressure compressor 6 and the high-pressure turbine 8 are mechanically connected by a drive shaft of the high-pressure compressor 6, to form a high-pressure body of the turbo-engine 1. Similarly, the low-pressure compressor 4 and the low-pressure turbine 10 are mechanically connected by a turbo-engine shaft, so as to form a low-pressure body of the turbo-engine 1.

The high-low-pressure compressor 4, the high-pressure compressor 6, the combustion chamber 7, the high-pressure turbine 8 and the low-pressure turbine 10 are surrounded by a housing 9 which extends from the intake duct 2 to the low-pressure turbine 10.

Figure 2:
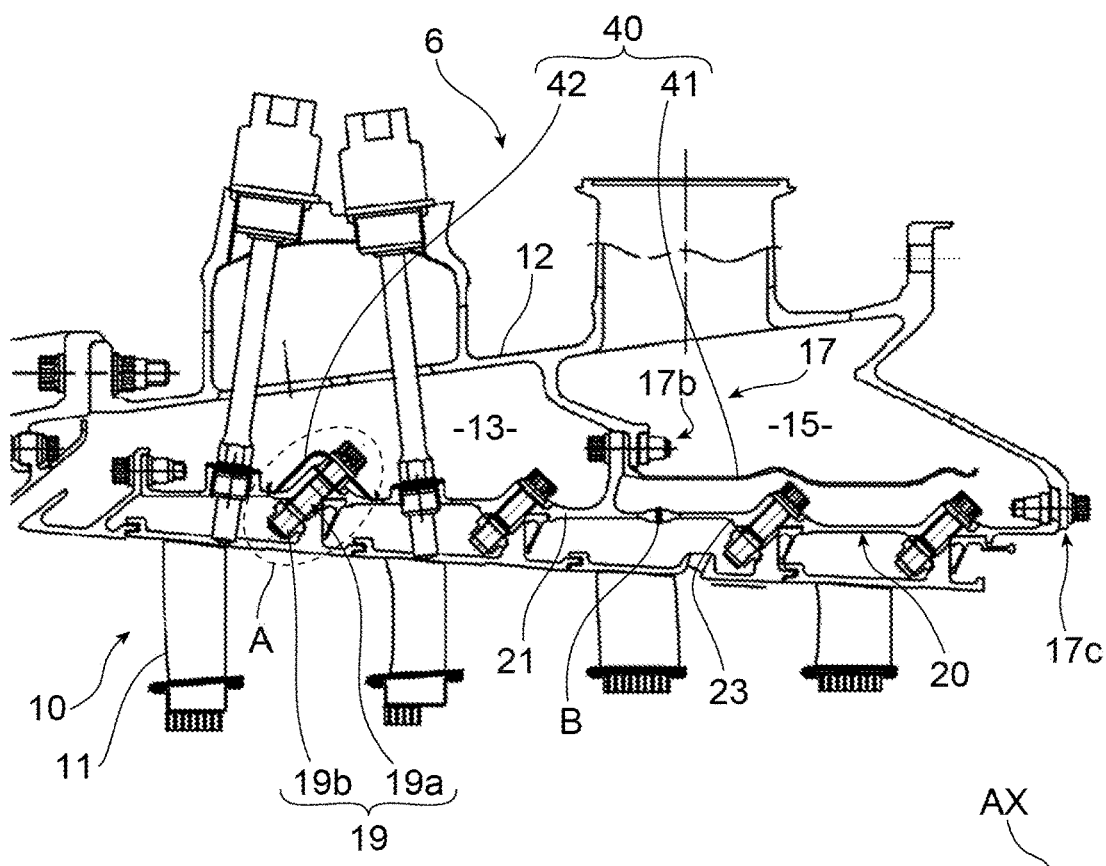
FIG. 2 is a partial longitudinal sectional representation of a high-pressure turbo-engine compressor, according to the first embodiment.

FIG. 2 represents a downstream portion of the high-pressure compressor 6 which forms a compressor module of the turbo-engine 1. The high-pressure compressor 6 comprises a plurality of stages 10, an external housing 12, an internal housing 20 and cooling air cavities 13, 15 which is situated between the internal housing 20 and the external housing 12. It is annular about the longitudinal axis AX thereof.

Unless specified otherwise, the adjectives "axial", "radial" and "circumferential" are defined with respect to the axis of revolution AX of the high-pressure compressor 6 and particularly to that of the internal housing 20. An axial direction is a direction substantially parallel to the longitudinal axis AX. A radial direction is a direction substantially orthogonal to the axis AX of the compressor 6 and secant with the axis AX of the compressor 6. A circumferential direction C-C is a direction about the longitudinal axis AX of the high-pressure compressor 6.

Each stage 10 comprises a wheel (not shown) and a distributor.

The wheel is movable about the longitudinal axis AX of the high-pressure compressor 6. It comprises an annular row of mobile blades (not shown) and a rotor disk (not shown) bearing these mobile blades.

The distributor is part of the turbo-engine stator. It is divided circumferentially into annular sectors which each comprise fixed blades 11 spaced out from one another and which are inserted along the direction of the longitudinal axis AX between the annular rows of mobile blades.

The external housing 12 delimits the high-pressure compressor 6 radially outwards relative to the longitudinal axis AX thereof. It surrounds the internal casing 20.

The internal casing 20 is situated radially outside the flow jet of the high-pressure compressor 6. It comprises a first portion 21 and a second portion 23 which is adjacent to the first portion 21 along the longitudinal direction AX. The internal housing 20 surrounds for example the stages 5, 6, 7 and 8 of the high-pressure compressor 6.

The first portion 21 is referred to as the upstream portion hereinafter in the disclosure. The upstream portion 21 and the downstream portion 23 are connected mechanically to one another by a weld in a connection region B. The connection region B is for example situated at the level of the seventh stage of the compressor 6.

Figure 4:
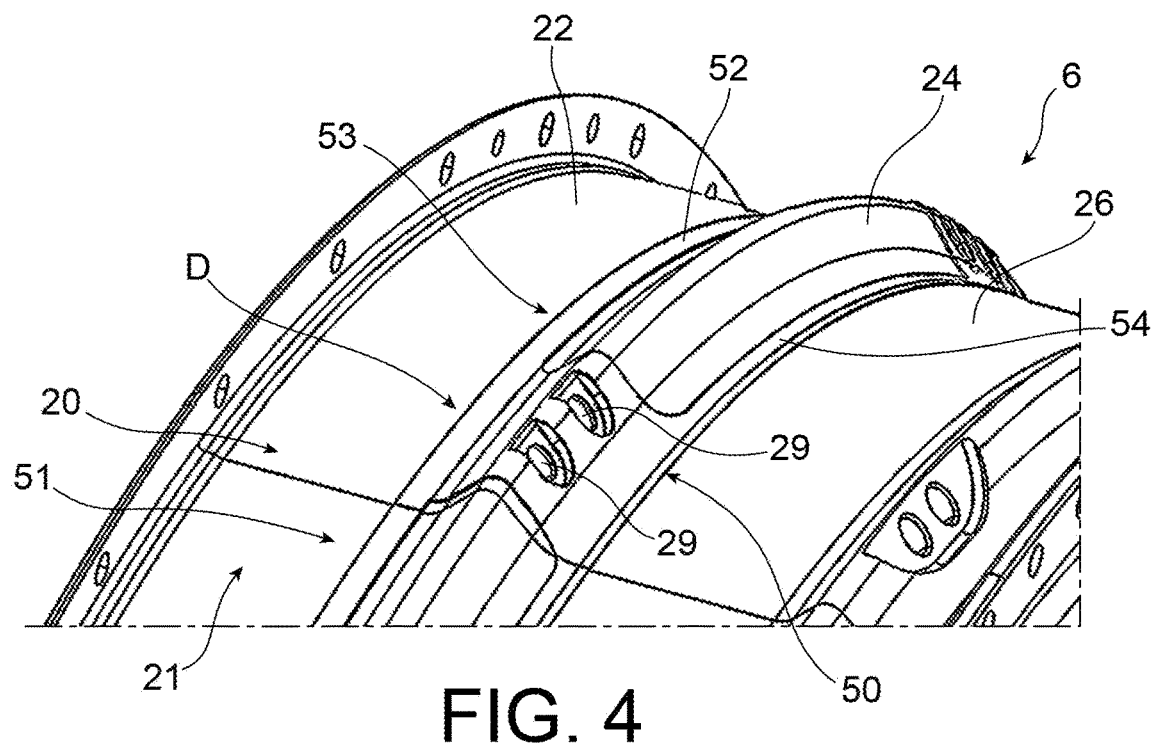
FIG. 4 is a partial schematic perspective representation of the housing equipped with a wear protection strip, according to the first embodiment of the invention.

The upstream portion 21 is made of a first material. With reference to FIG. 4, the upstream portion 21 comprises from upstream to downstream, an upstream flank 22, an annular boss 24 and a downstream flank 26 which is situated in the vicinity of detail A which is represented in FIG. 2.

The annular boss 24 is protruding out from the internal housing 20 relative to the upstream flank 22 and to the downstream flank 26 joined thereby. The annular boss 24 extends along the entire circumferential length C-C of the internal housing 20. It is traversed by orifices 29 for inserting a fastening attachment of a thermal protection sheet.

Figure 5:
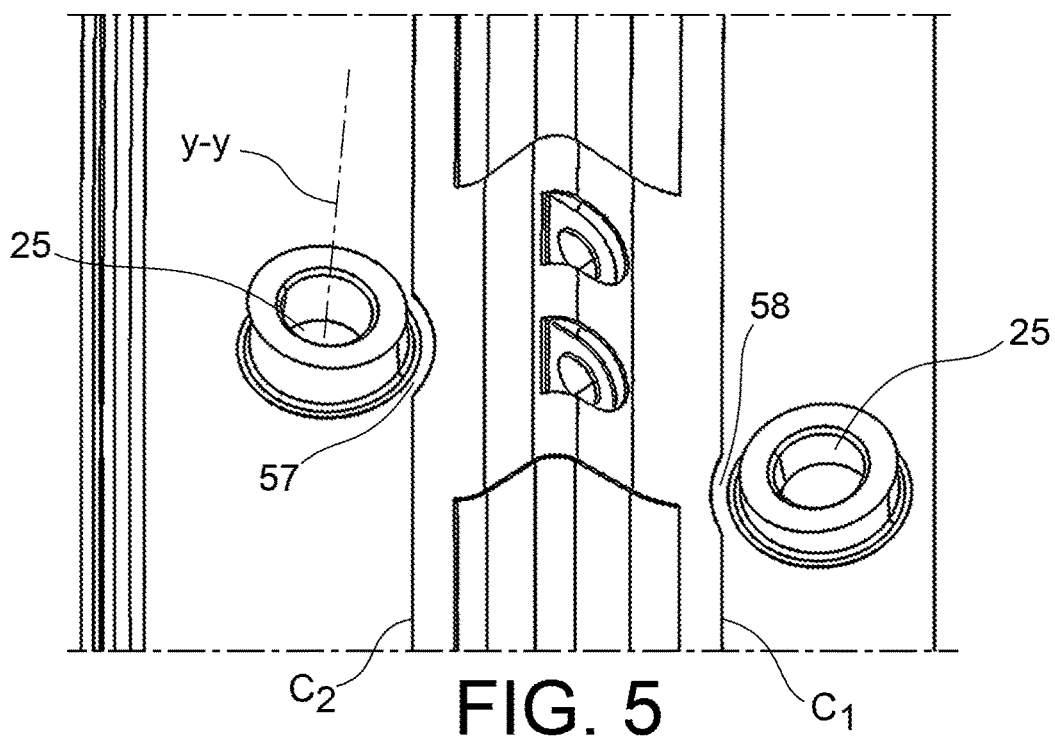
FIG. 5 is a perspective representation of the housing equipped with the wear protection strip in the vicinity of an orifice for inserting endoscopic tools.

With reference to FIG. 5, the upstream flank 22 and the downstream flank 26 are traversed by orifices 25 for inserting endoscopic tools into the primary jet. These orifices 25 extend along a direction Y-Y which is substantially radial. The endoscopic tools serve to inspect the blades in the primary jet at the level of the high-pressure compressor 6, without having to dismantle same.

With reference once again to FIG. 2, the second portion 23 is made of a second material having a lower thermal expansion coefficient that that of the first material. This difference in material makes it possible to limit the differential expansions of the downstream portion 23 relative to the upstream portion 21, despite the increase in the temperature of the air traversing the compressor 6 in the downstream direction. The first material and the second material are metallic. They comprise for example a nickel-based alloy for the aeronautical industry, such as an Inconel$^{TR}$.

The internal housing 20 is connected to the external housing 12 by a set 17 of attachments. The set 17 of attachments comprises an intermediate attachment 17b and a downstream attachment 17c. Each of the attachments comprises a screw and a nut engaging with the screw.

The intermediate attachment 17b directly connects the upstream portion 21 to the external housing 12. The intermediate attachment 17b is situated in the vicinity of the connection region B. It is particularly around the same stage 10 as the connection region B.

The downstream attachment 17c directly connects the downstream portion 23 to the external housing 12. The downstream attachment 17c axially delimits the internal housing 20 downstream.

The internal housing 20 and the external housing 12 delimit between one another a first cooling cavity 13 which extends axially between the upstream end of the internal housing 20 and the intermediate attachment 17b.

The internal housing 20 and the external housing 12 delimit between one another a second cooling cavity 15 which extends axially between the intermediate attachment 17b and the downstream attachment 17c.

The internal housing 20 is traversed by first orifices for extracting air in the primary jet which open into the first cavity 13. These first orifices are situated axially in the vicinity of a thermal protection sheet 42 of the upstream portion 21, particularly at the level of the same stage 10 as the thermal protection sheet 42.

The internal housing 20 is also traversed by second air extraction orifices which open into the second cavity 15. These second orifices are situated axially in the vicinity of the junction region B between the upstream portion 21 and the downstream portion 23.

The air extracted in the jet and supplying the cooling air cavities 13, 15 is intended to supply an aircraft cabin with pressurised air. In addition or alternatively, it serves to supply the high-pressure turbine 8 and/or the low-pressure turbine 10 with cooling air, to limit the differential expansions between the housing 9 and mobile turbine blades.

These air extractions in the primary jet tend to induce increased heat exchanges with the internal housing 20. This results in an increase in the risks of differential thermal expansion of the internal housing 20 relative to the mobile blades 11, and therefore in the radial distance between the tip of the mobile blades 11 and the internal housing 20 which is detrimental to the efficiency of the turbo-engine 1.

The high-pressure compressor 6 comprises two thermal protection shells 40, in order to protect same thermally from the cooling air extracted in the primary jet.

The second thermal protection shell comprises a deflector 41. The deflector 41 is attached to the internal housing 20 and to the external housing 12 by the intermediate attachment 17b. It takes the form of a corrugated sheet extending downstream from the intermediate attachment 17b. This corrugated sheet extends over substantially the entire circumferential span of the internal housing 20. The deflector 41 is designed to guide the air extracted in the jet, inside the second cooling air cavity 15.

Figure 3:
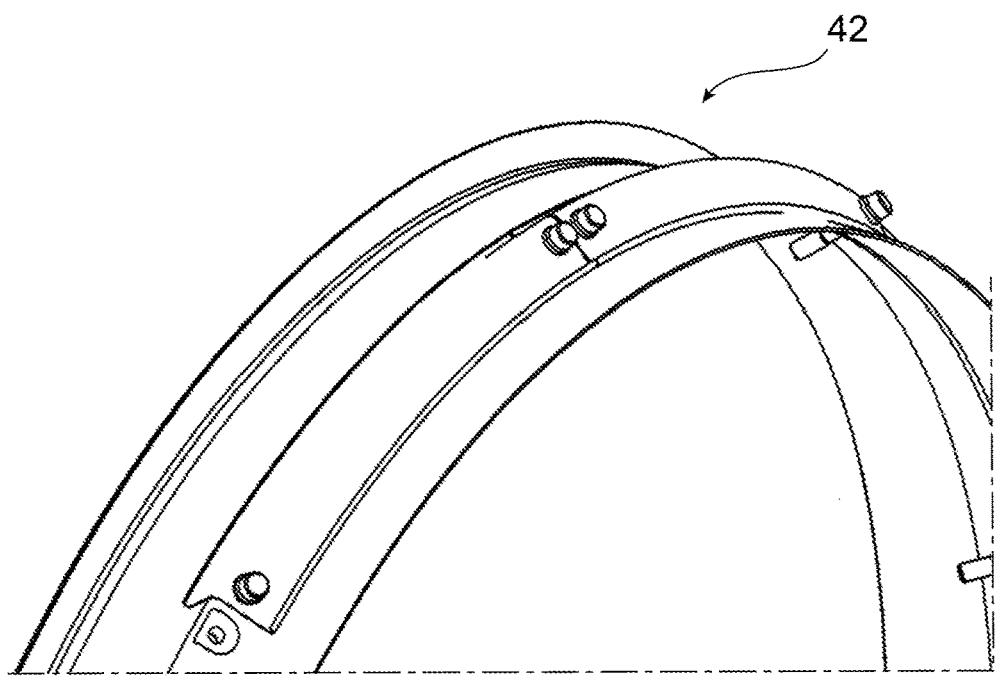
FIG. 3 is a partial perspective representation of an angular portion of a thermal protection shell for an internal high-pressure compressor housing, according to the first embodiment.

With joint reference to detail A in FIG. 2 and to FIG. 3, the first thermal protection shell comprises a thermal protection sheet 42 which is housed in the first cooling air cavity 13.

The thermal protection sheet 42 takes the form of a sectorised ring. It extends over substantially the entire span of the housing along the circumferential direction C-C, i.e. over an angular distance of 360°. The thermal protection sheet 42 is made of the same material as the downstream housing portion 21 covered thereby, to limit the thermal expansions between the upstream portion 21 and the thermal protection sheet 42. It is configured to partially cover the internal housing 20, in order to protect same thermally in the vicinity of the first air extraction orifices. It serves for this reason as a thermal cover sheet.

The thermal protection sheet 42 is rigidly secured to the internal housing 20 by at least a plurality of attachments 19 which are spaced from one another along the circumferential direction C-C of the internal housing 20. Each attachment 19 comprises a fastening screw 19a and a nut 19b which engages with the fastening screw 19a.

The upstream portion 21 tends to exhibit wear zones in the junction region A of the thermal protection sheet 42 with the upstream portion 21. These wear zones may result in the replacement of the internal housing 20 if they are excessive, which particularly involves dismantling the external housing 12.

In order to limit the wear zones of the upstream portion 21, while thermally protecting the internal housing 20 from the air extracted in the primary jet, the high-pressure compressor 6 comprises a wear protection strip 50. This strip is referred to as anti-wear strip 50 hereinafter in the disclosure.

Figure 6:
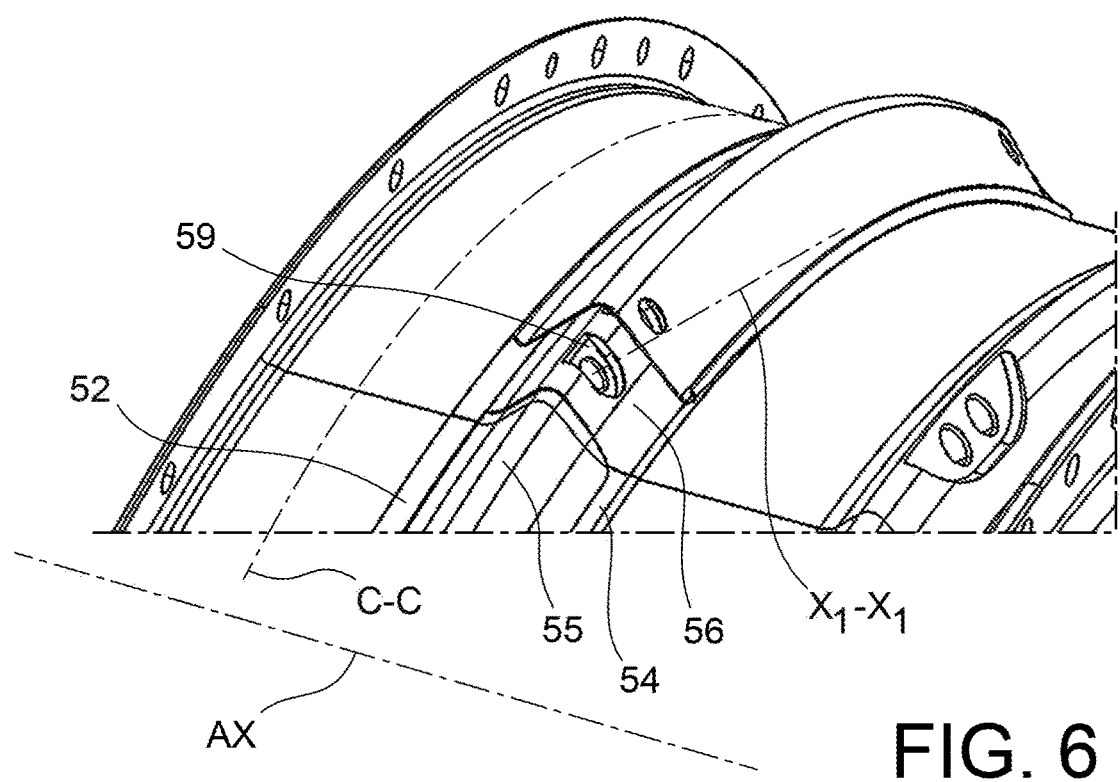
FIG. 6 is a partial perspective representation of the housing and of a portion of the wear protection strip illustrating the mounting of the anti-wear strip on the housing.

With reference to FIGS. 4 to 6, the anti-wear strip 50 is situated radially between the internal housing 20 and the thermal protection sheet 42. It is situated axially and circumferentially in the junction region A of the internal housing 20 and the thermal protection sheet 42. As a general rule, the anti-wear strip 50 extends over a circumferential length less than or equal to that of the thermal protection sheet 42. In the embodiment shown, it extends over the entire length of the internal housing 20 along the circumferential direction C-C. It is attached to the internal housing 20 and to the thermal protection sheet 42 by the fastening attachments 19 of the thermal protection sheet 42. It is pressed against the internal housing 20 by these attachments 19.

The anti-wear strip 50 moulds the shape of the housing portion 21 covered partially axially thereby. It has a small thickness with regard to that of the internal housing 20, for example of the order of 0.5 mm to 0.8 mm. The anti-wear strip 50 then has very little impact on the thermal expansion of the internal housing 20, while protecting same mechanically. Due to the small thickness thereof, the anti-wear strip 50 also has a limited mass.

It comprises a first annular sector 51 and at least one second annular sector 53 which is adjacent circumferentially to the first annual sector 51. The first annular sector 51 and the second annular sector 53 are in contact with one another in a separation region D which is situated at a circumferential end of each of these annular sectors 51, 53.

The annular sectors 51, 53 facilitate the installation of the anti-wear strip 50 on the internal housing 20 with respect to a one-piece anti-wear strip 50.

The anti-wear strip 50 is made of the same material as that of the upstream housing portion 21 covered thereby, and as that of the thermal protection sheet 42, which limits the differential expansions between the internal housing 20 and the thermal protection sheet 42 and thereby the wear of the internal housing 20.

The first annular sector 51 and the second annular sector 53 each comprise a first circumferential segment 52, a second circumferential segment 54 and at least one connection zone 56 between the circumferential segments 52, 54.

The first circumferential segment 52 extends along the circumferential direction C-C. It is situated in a first bearing zone $C_1$ of the thermal protection sheet 42 against the internal housing 20. It moulds the shape of the upstream flank portion 22 covered thereby. It exhibits a width greater than or equal to that of the upstream bearing width of the thermal protection sheet 42 on the internal housing 20.

The annular boss 24 of the housing is situated axially between the first circumferential segment 52 and the second circumferential segment 54. It forms an axial abutment for the first circumferential segment 52 and the second circumferential segment 54.

The second circumferential segment 54 extends along the circumferential direction C-C. It is situated in a second bearing zone $C_2$ of the thermal protection sheet 42 against the internal housing 20. It moulds the shape of the downstream flank portion 26 covered thereby. It exhibits a width greater than or equal to that of the downstream bearing width of the thermal protection sheet 42 on the internal housing 20.

The connection zone 56 connects the first circumferential segment 52 to the second circumferential segment 54. The anti-wear strip 50 comprises a number of connection zones 56 equal to the number of attachments 19. Each connection zone 56 corresponds to the location envisaged for one of the attachments 19 of the thermal protection sheet 42 to the internal housing 20. Each connection zone 56 moulds the shape of the boss 24 covered thereby. It is traversed by at least one orifice 59 for inserting one of the fastening attachments 19 of the thermal protection sheet 42. These orifices 59 are oriented along a direction $X_1$-$X_1$ which is inclined with respect to the longitudinal direction. The connection zone 56 thereby forms an attachment zone of the wear protection strip 50 to the thermal protection shell 40, and an attachment zone of the wear protection strip 50 to the housing 20.

The circumferential segments 52 and 54 define with the connection zones 56 at least one circumferential recess 55 which is situated therebetween along the longitudinal direction AX of the module, outside the connection zone 56. Each circumferential recess 55 is particularly situated outside the bearing zones $C_1$, $C_2$ of the thermal protection sheet 42 against the internal housing 20. The anti-wear strip 50 comprises at least as many circumferential recesses 55 as connection zones 56. These circumferential recesses 55 are spaced circumferentially in relation to one another by connection zones 56.

The anti-wear strip 50 is open-worked at the level of the recesses 55. In other words, the recesses 55 are holes traversing the anti-wear strip 50, which reduces the mass thereof. Moreover, the circumferential recesses 55 limit the influence of the anti-wear strip 50 on the thermal expansion of the internal housing 20.

With reference to FIG. 5, the first circumferential segment 52 comprises at least one first lateral recess 57 which enables the first circumferential segment 52 to bypass the edge of one of the orifices 25 for inserting endoscopic tools which is situated in the vicinity of the boss 24 of the internal housing 20.

The second circumferential segment 54 comprises at least one second lateral recess 58 which enables the second circumferential segment 54 to bypass the edge of one of the orifices 25 for inserting endoscopic tools which is situated in the vicinity of the boss 24 of the internal housing 20.

The lateral recesses 57, 58 facilitate the mounting of the anti-wear strip 50 on the internal housing 20 in the presence of orifices 25 for inserting endoscopic tools, while enabling more satisfactory mechanical protection of the internal housing 20 at a distance from these orifices 25.

The method for mounting the anti-wear strip 50 and the thermal protection sheet 42 is illustrated with reference to FIGS. 2, 4 and 6.

With reference to FIG. 6, the first annular sector 51 is first placed in mechanical contact with the internal housing 20 at the level of the junction region A, the orifices 59 for inserting the fastening attachments 19 facing the corresponding orifices 29 of the internal housing 20.

Then with reference to FIG. 4, the second annular sector 53 is placed in contact with the internal housing 20 at the level of the junction region A, being in contact with the first annular sector 51 at the level of the separation region D.

The thermal protection sheet 42 is then placed in contact with the internal housing 20 and the anti-wear strip 50, the upstream edge thereof bearing on the first circumferential segment 52, the downstream edge thereof bearing on the second circumferential segment 54, and such that the attachments 19 can be fitted facing the passage orifices 29, 59.

The screws 19a for fastening the thermal protection sheet are then inserted through the thermal protection sheet 42 and the passage orifices 59, 29 of these screws. They are fastened by the corresponding bolts 19b.

The operations for dismantling the anti-wear strip 50 are carried out in the reverse order of the mounting operations described above.

The anti-wear strip 50 has the effect of reducing the wear zones of the internal housing 20 in the junction region A of the internal housing 20 and of the thermal protection sheet 42. The anti-wear strip 50 also enables effective thermal protection of the internal housing 20 by the thermal protection sheet 42. The air leakages from the primary jet and the play at the tip of the mobile blades 11 in the primary jet are then limited, which tends to increase the efficiency of the turbo-engine 1.

Obviously, various modifications may be made by those skilled in the art to the invention described hereinabove without leaving the scope of the disclosure of the invention.

The shape of the anti-wear strip 50, the shape of the internal housing 20, that of the external housing 12 and/or of the thermal protection sheet 42 may vary.

In particular, the thermal protection sheet 42 may extend over an angular portion of the high-pressure compressor 6, as for the anti-wear strip 50.

Alternatively, the anti-wear strip 50 is one-piece, rather than being formed by at least two annular sectors 51, 53.

The invention claimed is:

1. A turbo-engine module, comprising:
   a turbo-engine housing,
   a thermal protection shell of the housing, wherein the thermal protection shell is configured to cover at least partially the housing in order to protect the housing thermally,
   wherein the module comprises a wear protection strip which is situated between the housing and the thermal protection shell in a junction region of the housing and the thermal protection shell,
   wherein the wear protection strip comprises at least one recess, wherein the wear protection strip is open-worked at the recess,
   wherein the recess is situated outside a zone for fastening the wear protection strip to the thermal protection shell and/or the housing.

2. The turbo-engine module according to claim 1, wherein the wear protection strip covers a housing portion, wherein a material of the wear protection strip is the same as a material of the housing portion, and/or wherein a material of the wear protection strip is the same as a material of the thermal protection shell.

3. The turbo-engine module according to claim 1, wherein the wear protection strip has a thickness between 0.3 mm and 0.8 mm.

4. The turbo-engine module according to claim 1, wherein the thermal protection shell is secured to the housing by at least one attachment,
   wherein the wear protection strip is fastened to the housing and to the thermal protection shell by the attachment.

5. The turbo-engine module according to claim 4, wherein the attachment comprises a fastening screw.

6. The turbo-engine module according to claim 1, wherein the wear protection strip is pressed by the thermal protection shell against the housing, wherein the wear protection strip conforms to the shape of the housing portion covered thereby.

7. The turbo-engine module according to claim 1, wherein the thermal protection shell is centred with respect to the wear protection strip along a longitudinal direction of the module, wherein the wear protection strip is of greater width than the width of the thermal protection shell along the longitudinal direction of the module.

8. The turbo-engine module according to claim 1, wherein the wear protection strip comprises:
   a first circumferential segment configured to be placed in a first bearing zone of the thermal protection shell against the housing,
   a second circumferential segment which is axially spaced with respect to the first circumferential segment and wherein the second circumferential segment is configured to be placed in a second bearing zone of the thermal protection shell against the housing, and
   a connection zone between the circumferential segments, wherein the connection zone connects the first circumferential segment to the second circumferential segment,
   wherein the connection zone is the zone for fastening the wear protection strip to the thermal protection shell and/or the housing.

9. The turbo-engine module according to claim 8, wherein the housing comprises an annular boss which is situated axially between the first circumferential segment and the second circumferential segment, and wherein the annular boss forms an axial abutment for the first circumferential segment and the second circumferential segment.

10. The turbo-engine module according to claim 8, wherein the recess is situated axially between the first bearing zone of the thermal protection shell against the housing and the second bearing zone of the thermal protection shell against the housing.

11. The turbo-engine module according to claim 1, wherein the wear protection strip comprises a first annular sector and a second annular sector which is adjacent to the first annular sector along a circumferential direction of the module.

12. The turbo-engine module according to claim 1, wherein the module comprises a turbo-engine compressor.

13. The turbo-engine module according to claim 12, wherein the compressor is a high-pressure turbo-engine compressor.

14. The turbo-engine module according to claim 1, wherein the housing is situated radially outside a gas flow jet in the turbo-engine relative to a longitudinal axis of the module, wherein the housing is traversed by orifices for extracting air in the jet.

15. The turbo-engine module according to claim 14, wherein the housing comprises:
   a first portion in a first material, and
   a second portion which is adjacent to the first portion along the longitudinal axis of the module oriented in the gas flow direction through the module, wherein the second portion is made of a second material having a lower thermal expansion coefficient than the thermal expansion coefficient of the first material.

* * * * *